J. REINS & S. G. EGGLESTON.
BABBITTING JIG.
APPLICATION FILED JULY 12, 1917.
1,260,452.
Patented Mar. 26, 1918.
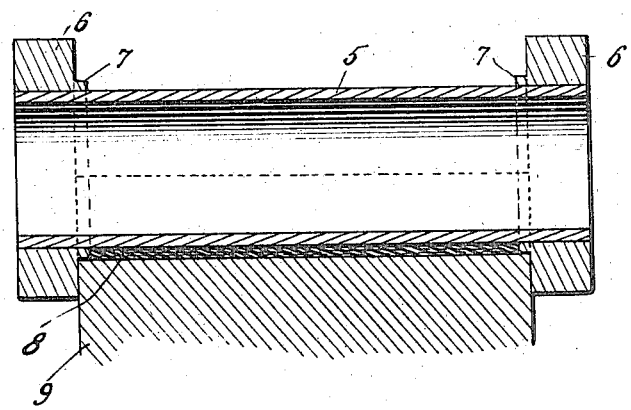
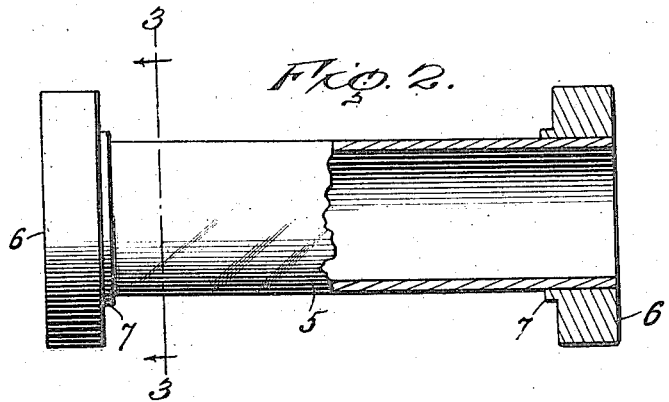
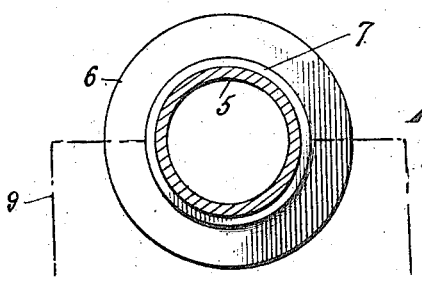
Inventor
S. G. Eggleston
J. Reins
By
Attorneys

UNITED STATES PATENT OFFICE.

JACOB REINS AND SPENCER G. EGGLESTON, OF IROQUOIS, SOUTH DAKOTA.

BABBITTING-JIG.

1,260,452.   Specification of Letters Patent.   Patented Mar. 26, 1918.

Application filed July 12, 1917. Serial No. 180,139.

*To all whom it may concern:*

Be it known that we, JACOB REINS and SPENCER G. EGGLESTON, citizens of the United States, residing at Iroquois, in the county of Kingsbury and State of South Dakota, have invented new and useful Improvements in Babbitting-Jigs, of which the following is a specification.

The appliance which is the subject matter of the present application for patent is designed for rebabbitting or relining the bearings of engine crank shafts, and more particularly the main bearings of motor vehicles, the object of the invention being to provide a simple appliance of this kind by the use of which the molding of the liner of Babbitt metal within the bearing block can be readily and accurately accomplished by any ordinary repairman, an especially skilled mechanic not being necessary.

The object stated is attained by means of a novel combination and arrangement of parts to be hereinafter described and claimed, and in order that the same may be better understood, reference is had to the accompanying drawing forming a part of this specification.

In the drawing,

Figure 1 is a longitudinal section of the device in place on the bearing showing the manner in which it is used;

Fig. 2 is an elevation of the device, partly in section, and

Fig. 3 is a cross-section on the line 3—3 of Fig. 2.

In carrying out the invention, there is provided a core in the form of a metal tube 5 on the ends of which are mounted collars 6. The hole in the collars in which the tube seats is surrounded by an outstanding annular flange 7. The depth of this flange corresponds to the thickness of the Babbitt lining 8 to be run into the bearing, and the length of the tube corresponds to the width of the bearing block 9. The external diameter of the tube is the same as the diameter of the shaft which is supported in the bearing.

In use, the collars 6 are adjusted on the tube 5 so that when the latter is positioned lengthwise in the bearing seat of the block 9, the inner faces of the collars seat against the ends of the block, and the flanges 7 engage the bearing seat, as shown in Fig. 1. As the tube is held spaced from the bearing seat a distance corresponding to the thickness of the Babbitt liner to be run thereinto, and the tube has the same diameter as the crank shaft, it will be evident that when the metal is run into the space between the tube and the seat, a liner is produced which will make a perfect fit. Before running the metal in, the tube may be heated so that the metal may run freely.

The device will be found particularly useful for rebabbitting the main crank shaft bearings of Ford cars, in which the bearing blocks are all milled so that they require exactly the same thickness of Babbitt metal. Blocks that need rebabbitting are usually sent to a Ford distributing branch, but with the use of the device hereinbefore described any ordinary repairman, and not necessarily a skilled mechanic, can run the three bearings in a very short time and with the utmost accuracy.

We claim:—

1. A babbitting jig comprising a core, and collars mounted on the ends of the core, said collars having outstanding annular flanges on their inner faces of a greater diameter than that of the core for spacing the core from the bearing seat to be babbitted.

2. A babbitting jig comprising a hollow core, and collars mounted on the ends of the core, said collars having outstanding annular flanges on their inner faces of a greater diameter than that of the core for spacing the core from the bearing seat to be babbitted.

In testimony whereof we affix our signatures.

JACOB REINS.
SPENCER G. EGGLESTON.